United States Patent [19]

Richter

[11] Patent Number: 4,971,694

[45] Date of Patent: Nov. 20, 1990

[54] DOUBLE DIFFUSER WITH BACKFLUSH PISTONS

[75] Inventor: Ole J. Richter, Karlstad, Sweden

[73] Assignee: Kamyr AB, Karlstad, Sweden

[21] Appl. No.: 293,855

[22] Filed: Jan. 5, 1989

[51] Int. Cl.$^5$ ............................................. B01D 33/06
[52] U.S. Cl. ................................ 210/333.01; 210/342; 210/411
[58] Field of Search ............... 210/315, 316, 317, 332, 210/333.1, 333.01, 347, 342, 411, 412, 785, 323.2; 68/181 R, 184, 190, 251

[56] References Cited

U.S. PATENT DOCUMENTS

| | | | |
|---|---|---|---|
| 2,540,362 | 2/1951 | Winslow et al. | 210/323.2 |
| 3,387,708 | 6/1968 | Salomon et al. | 210/342 |
| 3,445,002 | 5/1969 | Muller | 210/333.1 |
| 3,491,886 | 1/1970 | Glas, II et al. | 210/347 |
| 4,172,037 | 10/1979 | Golston | 210/315 |
| 4,793,161 | 12/1988 | Richter | 210/411 |

Primary Examiner—Richard V. Fisher
Assistant Examiner—Wanda L. Millard
Attorney, Agent, or Firm—Nixon & Vanderhye

[57] ABSTRACT

Backflushing with internally mounted pistons and cylinders is provided in a pulp treating vertical vessel such as a paper pulp thickener, diffuser, or displacement bleacher. First and second sets of screens are mounted on a supporting arm/conduit within the vertical vessel, the first screens mounted directly to the arms and the second screens mounted on top of the first screens. A first cylinder is connected at one open end to the conduit and at the other open end is exposed to the pulp within the vessel. A second cylinder is mounted so that it is concentric with the first cylinder and both ends are in operative communication with the liquid conduit. A piston is mounted within each cylinder by a common vertically extending piston rod which connects them. The pistons and cylinders have different effective diameters. Relative movement between the pistons and cylinders is effected periodically in order to force liquid from within the cylinders into the conduit and ultimately out the screens to provide backflushing of the screens, which prevents clogging.

18 Claims, 3 Drawing Sheets

DOUBLE DIFFUSER WITH BACKFLUSH PISTONS

BACKGROUND AND SUMMARY OF THE INVENTION

In U.S. Pat. No. 4,793,161 (the disclosure of which is hereby incorporated by reference herein), an extremely effective apparatus and method for the backflushing of screens in paper pulp treatment vessels has been provided. The system illustrated and described in that application supplies backflushing liquid from interior of the vessel itself rather than from the exterior of the vessel, resulting in numerous advantages, including eliminating surge.

While the techniques illustrated in said U.S. Pat. No. 4,793,161 have been very successful when applied to conventional single stage diffusers or related pulp treating apparatus, prior to the invention they were not successfully applied to conventional double diffusers, such as illustrated in U.S. Pat. No. 4,172,037. In conventional double stage diffusers, supporting arms/liquid conduits are located between two sets of screens, with pulp treatment liquid introducing nozzles located underneath the diffuser units and rotated by an extension of the top scraper shaft with supporting bearing. However it is even more desirable in double diffusers, than single diffusers, to utilize the internal backflushing means of said U.S. Pat. No. 4,793,161 since the surge in the double diffusers is essentially twice that in a single diffuser.

According to the present invention, it is possible to utilize the advantageous internal backflushing means associated with said patent 4,793,161 in a double diffuser by providing a particular construction of the double diffuser screens, and by providing a particular construction of the backflushing units.

According to one aspect of the present invention, the screens comprise a first set of screens supported by a plurality of supporting arms/liquid conduits, and a second set of screens, extending above the first set and connected thereto. First extraction means are provided for extracting liquid through the first set of screens, and second extraction means independent of the first means are provided for extracting liquid through the second set of screens. First and second screen backflushing means are provided for respectively flushing each of the first and second sets of screens. Each screen backflushing means comprises—in the preferred embodiment—a piston and cylinder arrangement. Preferably, the first and second cylinders are concentric with each other, both having open ends communicating with the liquid conduit/supporting arms, and the first and second pistons are mounted on a common piston rod. A linear actuator—such as one mounted on top of the vessel or the like—is provided for effecting reciprocation between the pistons and cylinders, to provide the backflushing action. One face of the first piston is mounted in operative communication with the pulp, while its second face—and both faces of the second piston—are in operative communication with liquid within the liquid conduit/supporting arms.

Preferably treatment liquid introducing nozzles are provided for introducing treatment liquid into the vessel. The treatment liquid introducing structures preferably comprise first and second sets of nozzles mounted to a common rotating element at the top of the vessel. The first nozzles extend down into operative association with the first set of screens, and the second nozzles extend into operative association with the second set of screens. The pulp treating apparatus may be a diffusion washer, a displacement bleacher, or the like.

According to another aspect of the present invention a pulp treating apparatus may be provided which comprises: A generally upright vessel defining an interior volume containing pulp. Liquid conduit means mounted in the vessel. Liquid pumping means located within the vessel and comprising first and second chamber defining elements having first and second ends, respectively, the first end of the first chamber in open communication with pulp in the interior volume of the vessel, and the second end of the first chamber and the first and second ends of the second chamber in open communication with liquid in the liquid conduit. First and second liquid engaging elements mounted within the first and second chamber defining elements, respectively, for relative reciprocal movement; and means for effecting relative movement between the chamber defining elements and the liquid engaging elements to cause the liquid engaging elements to force liquid out of the chambers and into the liquid conduits in one direction of relative movement, and to take the liquid into the chambers from the liquid conduit means in another direction of relative movement.

According to another aspect of the present invention, a pulp treating apparatus is provided which comprises: A generally upright vessel defining an interior volume containing pulp. Liquid conduit means mounted in the vessel. A first cylinder open at its first end to the pulp in the vessel, and at its second end to the liquid in the conduit means. A second cylinder open at both the first and second ends thereof to the liquid in the conduit means. A first piston, with piston rod, mounted in the first cylinder; and a second piston, with piston rod, mounted in the second cylinder. And, means for effecting relative reciprocation between the pistons and cylinders.

It is the primary object of the present invention to provide for the effective backflushing of a double diffuser type of construction of pulp treatment vessel (e.g. diffusion washer), without surge or other adverse effects such as are common in prior art double diffusers. This and other objects of the invention will become clear from an inspection of the detailed description of the invention, and from the appended claims.

DETAILED DESCRIPTION OF THE DRAWINGS

Figure 1:
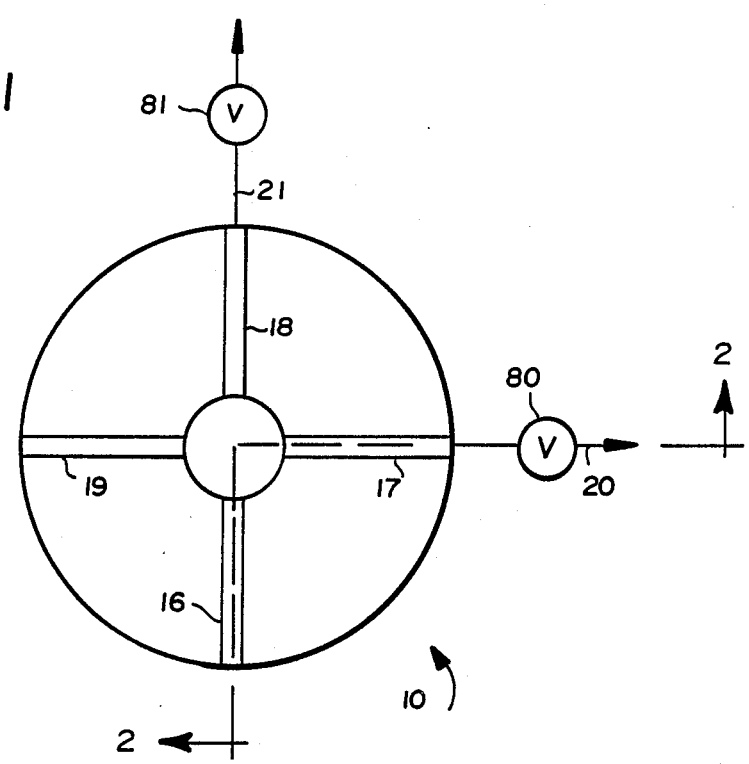
FIG. 1 is a bottom schematic view of an exemplary apparatus according to the invention.

The present invention comprises a pulp treating apparatus which is shown generally by the reference numeral 10. The apparatus 10 includes a generally upright vessel 11 having a pulp inlet 12 and a pulp outlet 13 which are vertically spaced from each other. The pulp is introduced into the pulp inlet 12, which typically is at the bottom, and flows vertically within the vessel 11, being discharged through the conduit 13 adjacent the top.

Mounted within the vessel 11 are a plurality of generally radially extending supporting arms/liquid conduits. These structures are illustrated by reference numerals 16 through 18 in FIG. 1. Preferably two of the conduits-/arms—e.g. 16, 18—are associated with one extraction line 21, while the other conduits—17, 19—are associated with another extraction conduit 20. While four spider arms/conduits 16 through 19 are illustrated in the drawings, another number could also be provided, as long as there were at least three such arms/conduits.

Mounted to the arms/conduits 16 through 19 are a first set of concentric cylindrical screens 23, having screen faces 24. Mounted atop the first set of screens 23 is a second set of cylindrical concentric screens 25, having screen faces 26. The screens 25 are mounted directly above the screens 3, being interconnected by upper headers 30. Along part of the circumference of the screens there are provided the blank wall portions 32 (see FIG. 3) for providing communication between the interiors of the screens 25 and the headers 30 to the supporting arms/conduits 17, 19. Instead of the blank wall portions internal funnels may be provided, as described with respect to FIGS. 4 and 5.

The apparatus 10 further comprises first extraction means for extracting liquid through the first set of screens, and second extraction means—independent of the first means—for extracting liquid through the second set of screens. The first extraction means includes the interiors of the arms/conduits 16, 18 and the extraction conduit 21, while the second extraction means includes the interiors of the arms/conduits 17, 19 and the extraction conduit 20.

Figure 2:
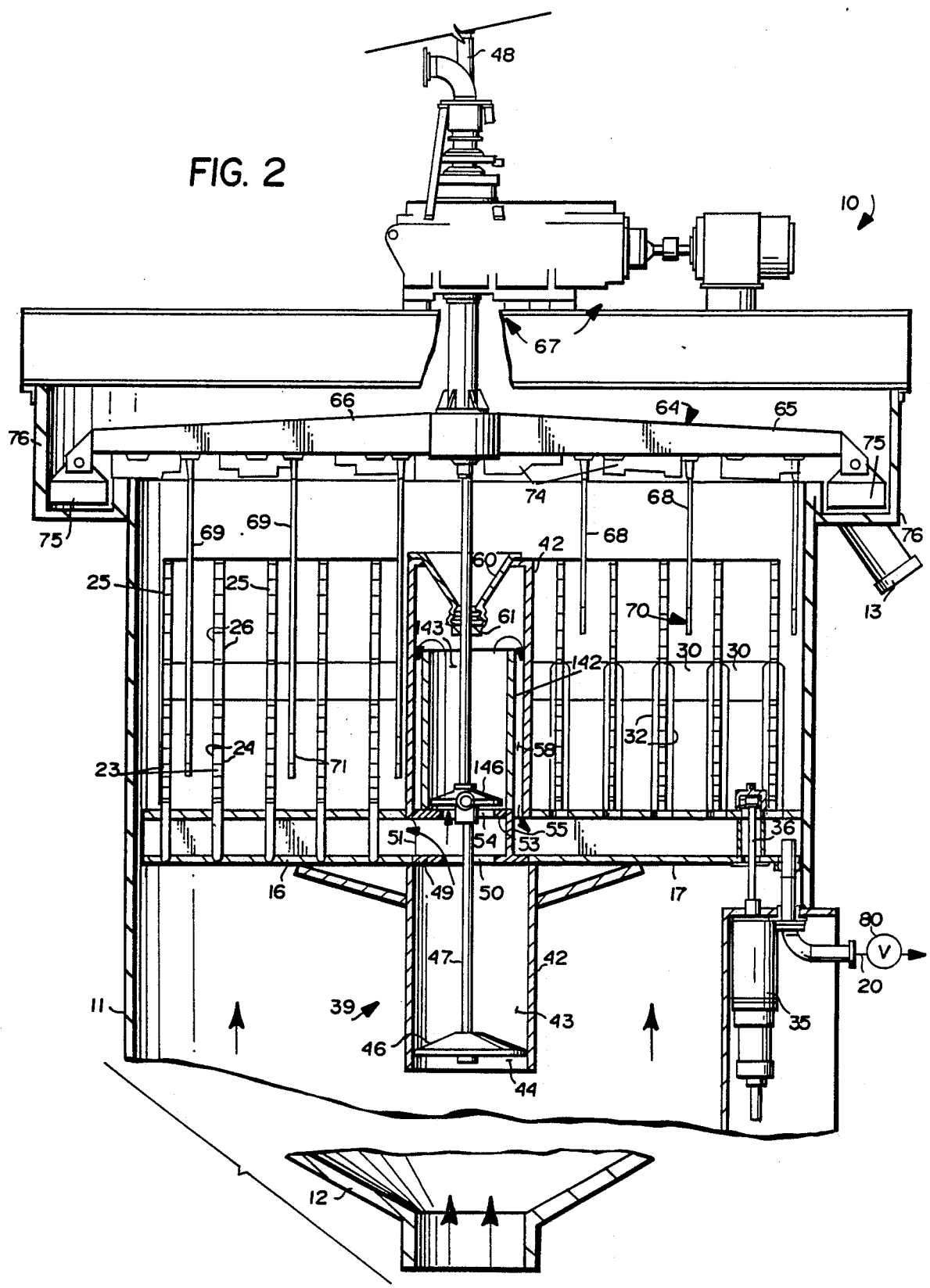
FIG. 2 is a side view, partly in cross-section and partly in elevation, of the details of an exemplary apparatus according to the invention, taken along lines 2—2 of FIG. 1.

The apparatus 10 further comprises means for effecting vertical movement of the screens and supporting arms/conduits in the direction of pulp movement at a first speed, and in a direction opposite to pulp movement at a second speed much faster than the first speed. Such utilization of reciprocating means is known per se in conventional diffusion washers and displacements bleachers, and in the exemplary embodiment illustrated in the drawings preferably takes the form of three or more linear actuators (e.g. hydraulic or pneumatic cylinder assemblies) 35 mounted around the exterior of the vessel 11, with each having a piston rod 36 extending into the interior of the vessel 11 and operatively connected to supporting arm/conduit (e.g. the arm 17 as illustrated in FIG. 2). Typically one linear actuator 35 would be associated with each arm/conduit, although less could be provided depending upon the particular design.

According to the invention there also is provided backflushing means for effecting backflushing of the screens 24, 25. The backflushing means are illustrated generally by reference numeral 39 in FIG. 2. The backflushing means includes a first backflushing means comprising a chamber defining element (cylinder 42) having a first end 44 open to the interior of the vessel 11, and a second end 43 open into operative association with the supporting arms/conduits (particularly the first set, 16, 18, thereof). A liquid engaging element (preferably a piston) 46 is mounted interiorly of the cylinder 42, and the piston rod 47 may be reciprocated by a linear actuator 48 mounted atop the vessel 11. At the top of the cylinder 43 is a plate 49, co-extensive with the arms 16 through 19, with means defining a central opening 50 therein. Liquid being expelled through the end 43 of the cylinder 42 passes through the opening 50, and into the means defining the entrance way 51 to the arms 16, 18. The structures 42, 46, etc. thus provide first backflushing means for backflushing the screens 23.

The backflushing means 39 also comprise second backflushing means. The second backflushing means comprise the chamber defining element (preferably cylinder) 142 having a second end 143 thereof and a first end (not shown) opposite the liquid engaging element (preferably piston) 146 from the end 143. Preferably the cylinders 142, 42 are concentric, and the pistons 46, 146 are mounted to the common piston rod 47. At the bottom of the cylinder 142 the wall 53 is provided, co-extensive with the tops of the arms/conduits 16 through 19, with means defining a central opening 54 therein. Also transverse walls 55 are provided for preventing direct communication between the arms 16, 18, and the arms 17, 19.

Note that the cylinder 42 preferably is extended so that it is both above and below the arms 16 through 19. The portion of the cylinder 42 above the arms 16 through 19, is concentric with the cylinder 142, defining an annular channel 58 therebetween. At the top of the cylinder extension 42, a flexible sealed connection is provided between the piston rod 47 and the cylinder 42, supported by the cone 60. Preferably cone 70 is of steel and is connected to flexible seal 61.

The pistons 46, 146 and cylinders 42, 142 have different diameters, the structures 46, 42 being significantly larger.

Mounted at the top of the interior of the vessel 11 is the rotating arm structure 64, which includes a plurality of arms such as arms 65, 66. When the apparatus 10 is to be utilized for treating pulp with a liquid (e.g. as a diffusion washer or a displacement bleacher), the pulp treatment fluid may be introduced into the vessel utilizing nozzles 68, 69. Note that nozzles 68—which are attached to arm 65—terminate at end portions 70 thereof (at which point the treatment liquid is actually introduced), which portions 70 are at the level of, and between, the second screens 25. The nozzles 69, on the other hand, are connected to the arms 66 and the treatment liquid flowing therethrough is introduced at portions 71 which are adjacent and between the first screens 23. The entire structure 64 is rotated by a conventional rotating structure, shown generally by reference numeral 67 in FIG. 2.

Note that the structure 64 also preferably comprises conventional rotating scraper elements for discharging the pulp—once it reaches the top of the vessel 11—through the outlet conduit 13. The structures that contribute to this function include the scraper blades 74 which are directly above the upward pulp path in the vessel 11, and the end-termination scraper blades 75 which are in the peripheral channel 76 at the top of the vessel 11, the conduit 13 extending downwardly from the channel 76. Valves 80, 81 are provided in the liquid extraction lines 20, 21.

Figure 3:
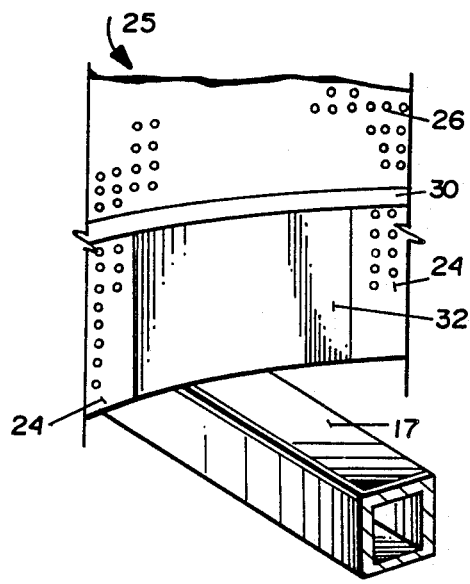
FIG. 3 is a detail perspective view of a portion of the apparatus of FIG. 2.
Figure 4:
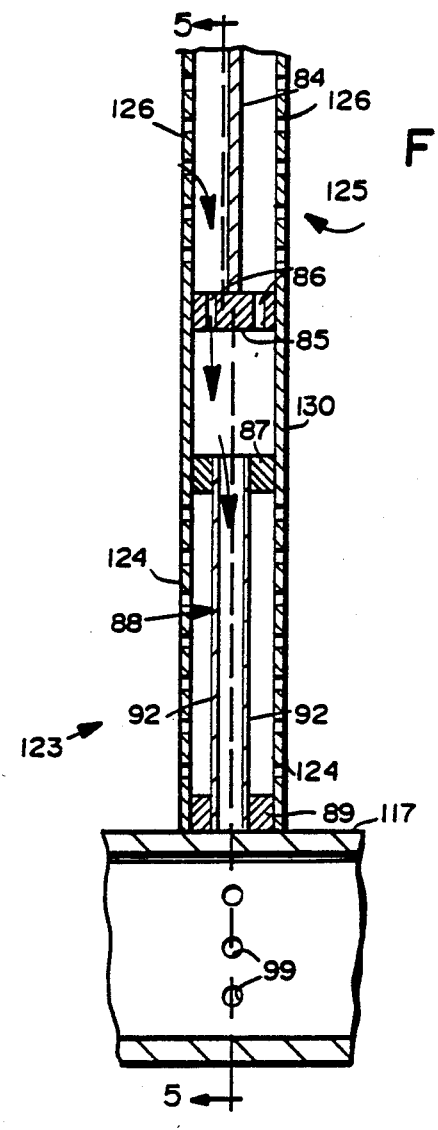
FIG. 4 is a cross-sectional view of another embodiment of screens and arm according to the invention in which internal funnel means are utilized instead of blank screen portions.
Figure 5:
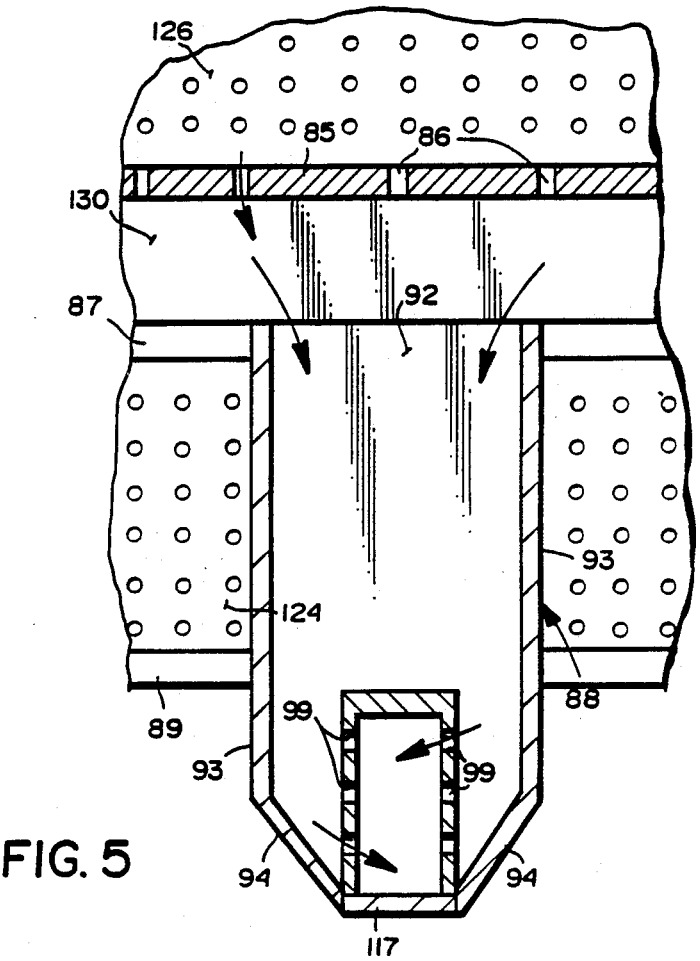
FIG. 5 is a cross-sectional view taken at lines 5—5 of FIG. 4.

Under some circumstances it is desirable to avoid the reduction in effective screen area that is caused by the blanked screen portions 32 illustrated in FIG. 3. In such situations, internal funnel means are provided, as illustrated in FIGS. 4 and 5. In the embodiment of FIGS. 4 and 5 structures identical to those in the FIGS. 1 through 3 embodiment are illustrated by the same reference numeral only preceded by "1".

As illustrated in FIG. 5, there can be a central divider 86 between the screen faces 126 of the second screen means 125, with a bottom plate 85 with openings 86 therein disposed at the top of the header 130, and a plate 87 receiving internal funnel means 88 at the bottom of the header 130. A spacer plate (or bars) 89 is provided at the bottom of the first screens 123 and connects the internal funnel means 88 and screen faces 124 to the arm 117.

Preferably the internal funnel means comprise structures having solid sidewalls 92, and solid end walls 93 which include portions thereof which extend outwardly from the first screens 123 and taper inwardly as illustrated at 94 in FIG. 5, surrounding the exterior of a portion of the arm 117 and being affixed thereto (as by welding). Means are provided defining openings 99 in the sides of the arm 117 at the portion thereof that is surrounded by the walls 93, 94, so that liquid screened from the pulp by the second screen set 125 can pass through openings 86 in plate 85, through header 130, and through the internal funnel means 88—and then through openings 99 into arm 117.

The exemplary apparatus according to the invention having been described, an exemplary manner of use will now be set forth:

Paper pulp, having any desired operable consistency, is introduced into pulp inlet 12 and flows upwardly in the vessel 11 toward the top thereof. The pulp moves past the screen faces 24, 6, as the screen sets 23, 25 are reciprocated upwardly by the linear actuators 35 at a slow speed Liquid from the pulp passes through the screen faces 24, 26 to the arms 16, 18 (in the case of screens 23), or 17, 19 respectively. Ultimately the liquid which passes through the screen faces passes out discharge conduits 20, 21, being valved by valves 80, 81.

Once the top of the stroke of the linear actuators 35 is reached, the actuators 35 are actuated to quickly move the screens 23, 25, and arms 16 through 19, downwardly. This movement, preferably combined with an upward reciprocation of the piston rod 47 by the linear actuator 48, effects backflushing action of the screens Extracted liquid in the second end 43 of the cylinder 42 is forced upwardly by the piston 46 so that it flows through the arms 16, 18, and up through the screens 23, and out the faces 24 thereof, unclogging the faces. At the same time, pulp from the interior of the vessel 11 fills cylinder 42 at the second end thereof. Thus the volume within the vessel 11 remains the same and there is no surge.

Liquid from the interior of the cylinder 42 also passes upwardly through openings 54 into the cylinder 142, and the upward movement of the piston 146 causes the liquid at the second end 143 thereof to pass into the annular channel 58, and into the arms 17, 19, up through the blank walled portions 32 of the screens 23, into the headers 30, and up through the second screens 25, passing through the faces 26 of the second screens 25 and unclogging them. Once the backflushing action has been completed, the slow upward movement of the screens and cylinders by the linear actuators 35 is continued, and the pistons 46, 146 are moved back to the position illustrated in FIG. 2.

As the pulp flows to the top of the vessel 11, it is engaged by the rotating scraper blades 74, and moved into the annular channels 76, from which it is expelled by the end blades 75 into the discharge conduit 13.

When the apparatus 10 comprises a diffusion washer, displacement bleacher, or the like, the nozzles 68, 69 are provided. As the scraper arm assembly 64 is slowly rotated, liquid passes through the arms 65 to the nozzles 68, and the same (or preferably a different) liquid passes through the arms 66 to the nozzles 69. The liquid from nozzles 68 is discharged at points 70 into operative association with the second set of screens 25, while liquid passing through the nozzles 69 passes through the portions 71 thereof into operative association with the first screens 23.

Thus it will be seen that according to the present invention an apparatus has been provided for successfully applying the no-surge principles of U.S. Pat. No. 4,793,161 to a double diffuser. While the invention has been herein shown and described in what is presently conceived to be the most practical and preferred embodiment thereof, it will be apparent to those of ordinary skill in the art that many modifications may be made thereof, and that the invention is to be accorded the broadest interpretation of the scope of the appended claims.

What is claimed is:

1. A pulp treating apparatus comprising:
a generally upright vessel defining an interior volume containing pulp to be treated;
a pulp inlet to the vessel;
a pulp outlet from the vessel, the pulp flowing generally vertically between the inlet and the outlet;
a plurality of screens mounted within the vessel;
said screens including a first set of screens supported by a plurality of supporting arms, and extending above the arms; and a second set of screens extending above the first set of screens;
first extraction means for extracting liquid through the first set of screens, comprising a first supporting arm;
second extracting means, independent of said first extraction means, for extracting liquid through the second set of screens, comprising a second supporting arm; and
first and second screen backflushing means for respectively flushing each of said first and second set of screens, each of said backflushing means mounted within the vessel and including a chamber defining element having first and second ends, the first end in open communication with liquid in said supporting arms, and the second end in operative communication with the pulp within the interior volume of the vessel; a liquid engaging element mounted within said chamber defining element for relative reciprocal movement between said liquid engaging element and said chamber defining element; and means for effecting relative movement between said chamber defining element and said liquid engaging element to cause said liquid engaging element to force liquid out of the chamber in one direction of relative movement between said elements, to effect backflushing, and take liquid into the chamber in another direction of relative movement therebetween; and each of said backflushing means is constructed so that said chamber defining element comprises an open ended cylinder, and said liquid engaging element comprises a piston, and said means for effecting relative movement between said chamber defining element and said liquid engaging element includes a piston rod.

2. Apparatus as recited in claim 1 wherein said piston rod is common to both pistons of said first and second backflushing means, said pistons being mounted to said rod one above the other.

3. Apparatus as recited in claim 2 wherein said second backflushing means cylinder is mounted concentrically within an extension of said first backflushing means cylinder, a passageway being defined between the two cylinders for the passage of liquid from the second piston to the supporting arms for said second set of screens.

4. Apparatus as recited in claim 3 wherein said second cylinder opens at the bottom thereof into the liquid conduit defined by said supporting arms, and said first cylinder opens at the top thereof into the liquid conduit defined by said supporting arms.

5. Apparatus as recited in claim 2 wherein said cylinders of said first and second backflushing means have differential diameters, said cylinder of said first backflushing means having a larger diameter than that of said second backflushing means, and said piston associated with said first backflushing means also having a larger diameter than said piston associated with said second backflushing means; only said first piston directly engaging pulp within the interior of said vessel.

6. Apparatus as recited in claim 2 further comprising first and second sets of nozzles for introducing treatment liquid into the vessel, said first set of nozzles having the introducing portion thereof terminating adjacent said first set of screens, and said second set of nozzles having a liquid introducing portion thereof terminating adjacent said second set of screens; said nozzles connected to a common rotating element at the top of said vessel.

7. Apparatus as recited in claim 1 wherein said second extraction means also comprises blank portions of said first screens, defining a liquid pathway from said second screens to said second arm.

8. Apparatus as recited in claim 1 wherein said second extraction means also comprises internal funnel means extending in said first screens, and having a portion in fluid engagement with the sides of a said supporting arm.

9. Pulp treating apparatus comprising:
a generally upright vessel defining an interior volume containing pulp;
liquid conduit means mounted in said vessel; and
liquid pumping means located within said vessel and comprising first and second cylinders having first and second ends, respectively, said first end of said first cylinder in open communication with pulp in the interior volume of the vessel, and said second end of said first cylinder and said first and second ends of said second cylinder in open communication with liquid in said liquid conduit; first and second liquid pistons within said first and second cylinders, respectively, for relative reciprocal movement; and means for effecting relative movement between said pistons and cylinders to cause said pistons to force liquid out of said cylinders and into the liquid conduits in one direction of relative movement, and to take the liquid into the cylinders from the liquid conduit means in another direction of relative movement.

10. Apparatus as recited in claim 9 wherein said first and second pistons are mounted on a common piston rod, said piston rod comprising a part of said means for effecting relative movement between said pistons and cylinders; and wherein said cylinders are concentric, said first cylinder and associated piston having a larger effective diameter than said second cylinder and associated piston.

11. Apparatus as recited in claim 10 further comprising first and second screen means disposed in said vessels, the first screens mounted directly to said liquid conduit means and said second screens mounted on top of said first screens, and said first cylinder operatively communicating with said first screens, and said cylinder operatively communicating with said second screens.

12. Pulp treating apparatus comprising
a generally upright vessel defining an interior volume containing pulp;
liquid conduit means mounted in said vessel;
a first cylinder open at its first end to the pulp in the vessel, and at its second end to the liquid in the conduit means;
a second cylinder open at both the first and second ends thereof to the liquid in said conduit means;
a first piston, with piston rod, mounted in said first cylinder; and a second piston, with piston rod, mounted in said second cylinder; and
means for effecting relative reciprocation between said pistons and cylinders.

13. Apparatus as recited in claim 12 wherein said first and second cylinders are concentric, and wherein a common piston rod mounts said first and second pistons, said first piston and cylinder having a larger effective area than said second piston and cylinder.

14. Apparatus as recited in claim 13 wherein said piston rod is operatively connected to a linear actuator located atop the upright vessel for effecting movement of the pistons within the cylinders.

15. A pulp treating apparatus comprising:
a generally upright vessel defining an interior volume containing pulp to be treated;
a pulp inlet to the vessel;
a pulp outlet from the vessel, the pulp flowing generally vertically between teh inlet and the outlet;
a plurality of screens mounted within the vessel;
said screens including a first set of screens supported by a plurality of supporting arms, and extending above the arms; and a second set of screens extending above the first set of screens;
first extraction means for extracting liquid through the first set of screens;
second extracting means, independent of said first extraction means, for extracting liquid through the second st of screens;
first and second screen backflushing means for respectively flushing each of said first and second set of screens, each of said backflushing means mounted within the vessel and including a chamber defining element having first and second ends, the first end in open communication with liquid in said supporting arms, and the second end in operative with the pulp within the interior volume of the vessel; a liquid engaging element mounted within said chamber defining element for relative reciprocal movement between said liquid engaging element and said chamber defining element; and means for effecting relative movement between said chamber defining element and said liquid engaging element to cause said liquid engaging element to force liquid out of the chamber in one direction of relative movement between said elements, to effect backflushing, and take liquid into the chamber in another direction of relative movement therebetween; and first and second sets of nozzles for introducing treatment liquid into the vessel, said first set of nozzles having a liquid introducing portion thereof terminating adjacent said first set of screens, and said second set of nozzles having a liquid introducing portion thereof terminating adjacent said second set of screens; said first and second sets of nozzles connected to a common rotating element at the top of said vessel.

16. Apparatus as recited in claim 15 wherein said first extraction means comprises a first of said supporting arms, and said second extraction means comprises a second of said supporting arms.

17. A pulp treating apparatus comprising:
a generally upright vessel defining an interior volume containing pulp to be treated;
a pulp inlet to the vessel;
a pulp outlet from the vessel, the pulp flowing generally vertically between the inlet and the outlet;
a plurality of screens mounted within the vessel;
said screens including a first set of screens supported by a plurality of supporting arms, and extending above the arms; and a second set of screens extending above the first set of screens;
first extraction means for extracting liquid through the first set of screens, comprising a first supporting arm;
second extracting means, independent of said first extraction means, for extracting liquid through the second set of screens, comprising a second supporting arm;
first and second screen backflushing means for respectively flushing each of said first and second set of screens, each of said backflushing means mounted within the vessel and including a chamber defining element having first and second ends, the first end in open communication with liquid in said supporting arms, and the second end in operative communication wit the pulp within the interior volume of the vessel; a liquid engaging element mounted within said chamber defining element for relative reciprocal movement between said liquid engaging element and said chamber defining element; and means for effecting relative movement between said chamber defining element and said liquid engaging element to cause said liquid engaging element to force liquid out of the chamber in one direction of relative movement between said elements, to effect backflushing, and take liquid into the chamber in another direction of relative movement therebetween; and wherein said second extraction means also comprises internal funnel means extending in said first screens, and having a portion in fluid engagement with the sides of a said supporting arms.

18. A pulp treating apparatus comprising:
a generally upright vessel defining an interior volume containing pulp to be treated;
a pulp inlet to the vessel;
a pulp outlet from the vessel, the pulp flowing generally
a plurality of screens mounted within the vessel;
said screens including a first set of screens supported by a plurality of supporting arms, and extending above the arms; and a second set of screens extending above the first set of screens;
first extraction means for extracting liquid through the first set of screens;
second extracting means, independent of said first extracting means, for extracting liquid through the second set of screens;
first and second screen backflushing means for respectively flushing each of said first and second set of screens, each of said backflushing means mounted within the vessel and including a chamber defining element having first and second ends, the first end in open communication with liquid in said supporting arms, and the second end in operative communication with the pulp within the interior volume of the vessel; a liquid engaging element mounted within said chamber defining element for relative reciprocal movement between said liquid engaging element and said chamber defining element; and means for effecting relative movement between said chamber defining element and said liquid engaging element to cause said liquid engaging element to force liquid out of the chamber in one direction of relative movement between said elements, to effect backflushing, and take liquid into the chamber in another direction of relative movement therebetween; and
means for effecting vertical movement of said screens and supporting arms in the direction of pulp movement at a first speed, and in the direction opposite to pulp movement at a second speed much faster than said first speed, and wherein said means for effecting vertical movement of said screens and supporting arms comprises fluid cylinder means mounted below said supporting arms and exteriorly of the vessel.

19. Apparatus as recited in claim 18 further comprising first and second sets of nozzles for introducing treatment liquid into the vessel, said first set of nozzles having the introducing portion thereof terminating adjacent said first set of

* * * * *

UNITED STATES PATENT AND TRADEMARK OFFICE
CERTIFICATE OF CORRECTION

PATENT NO. : 4,971,694

DATED : November 20, 1990

INVENTOR(S) : RICHTER, Ole J.

It is certified that error appears in the above-identified patent and that said Letters Patent is hereby corrected as shown below:

Column 4 line 36 change "70" to -- 60 --

Column 5 line 37 change "6" to -- 26 --

Column 5 line 39 after "speed" insert -- , --

Column 5 line 49 after "screens" insert -- . --

Column 8 line 47 change "teh" to -- the --

Column 8 line 57 change "st" to -- set --

Column 8 line 65 before "with" insert -- communication --

Column 9 line 48 change "wit" to -- with --

Column 10 line 12 after "generally" add -- vertically between the inlet and the outlet; --

Column 10 line 57 after "of" add -- screens, and said second set of nozzles having a liquid introducing portion thereof terminating adjacent said second set of screens; said nozzles connected to a common rotating element at the top of said vessel. --

Signed and Sealed this

Twenty-ninth Day of September, 1992

Attest:

DOUGLAS B. COMER

*Attesting Officer*   *Acting Commissioner of Patents and Trademarks*